United States Patent
Tsirkin et al.

(10) Patent No.: US 9,672,062 B1
(45) Date of Patent: Jun. 6, 2017

(54) BATCHED MEMORY PAGE HINTING

(71) Applicant: Red Hat, Inc., Raleigh, NC (US)

(72) Inventors: Michael Tsirkin, Yokneam Yillit (IL); Henri Han van Riel, Merrimack, NH (US)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 15/367,100

(22) Filed: Dec. 1, 2016

(51) Int. Cl.
*G06F 12/00* (2006.01)
*G06F 13/00* (2006.01)
*G06F 9/455* (2006.01)
*G06F 12/1027* (2016.01)
*G06F 3/06* (2006.01)
*G06F 12/02* (2006.01)

(52) U.S. Cl.
CPC .......... *G06F 9/45558* (2013.01); *G06F 3/065* (2013.01); *G06F 3/067* (2013.01); *G06F 3/0619* (2013.01); *G06F 12/1027* (2013.01); *G06F 12/02* (2013.01); *G06F 2009/45583* (2013.01); *G06F 2212/657* (2013.01)

(58) Field of Classification Search
CPC .. G06F 12/02; G06F 12/023; G06F 2212/657; G06F 12/00; G06F 12/0223
USPC .......................... 711/153, E12.001, E12.002
See application file for complete search history.

(56) References Cited

U.S. PATENT DOCUMENTS

| | | | | |
|---|---|---|---|---|
| 7,433,951 B1* | 10/2008 | Waldspurger | ......... | G06F 9/5016 709/223 |
| 7,516,292 B2* | 4/2009 | Kimura | ............... | G06F 12/0253 707/999.202 |
| 8,086,811 B2* | 12/2011 | Gainey, Jr. | .......... | G06F 9/30003 711/166 |
| 8,255,658 B2* | 8/2012 | Adachi | ................. | G06F 12/023 711/100 |
| 8,667,496 B2* | 3/2014 | Levin | .................... | G06F 9/5077 709/223 |
| 8,856,194 B2* | 10/2014 | Chen | ................... | G06F 12/0253 707/816 |
| 8,943,259 B2* | 1/2015 | Weissman | ............. | G06F 12/023 711/170 |
| 9,183,157 B2* | 11/2015 | Qiu | ........................ | G06F 12/10 |
| 9,298,377 B2* | 3/2016 | Baskakov | .......... | G06F 12/1081 |

(Continued)

OTHER PUBLICATIONS

Riel, Rik van. "Re: [patch: 0/6] Guest page hinting". Posted Mar. 27, 2009. <https://lkml.org/lkml/2009/3/27/503> and <https :/ /lkml.org/lkml/2009/3/27 /503> in thread <https :/ /lkml.org/lkm 1/2009/ 3/27 /223>.

(Continued)

*Primary Examiner* — Sean D Rossiter
(74) *Attorney, Agent, or Firm* — Lowenstein Sandler LLP

(57) ABSTRACT

Systems and methods for batching memory page hints that may enable a hypervisor to reuse a particular memory page without copying the particular memory page to and from swap space. An example method may comprise: releasing, by a guest operating system, a plurality of memory pages in use by the guest operating system; adding, by the guest operating system, the memory pages to a set of memory pages; determining, by the guest operating system, that the set of memory pages satisfies a predetermined threshold quantity; and responsive to the determining, notifying a hypervisor that the memory pages released by the guest operating system are available for reuse by the hypervisor.

20 Claims, 6 Drawing Sheets

(56) References Cited

U.S. PATENT DOCUMENTS

| | | | |
|---|---|---|---|
| 9,390,028 B2* | 7/2016 | Gordon | G06F 12/126 |
| 9,448,928 B2* | 9/2016 | Ahad | G06F 12/0253 |
| 9,524,233 B2* | 12/2016 | Venkatasubramanian | G06F 12/023 |
| 2007/0016904 A1 | 1/2007 | Adlung | |
| 2009/0307447 A1 | 12/2009 | Jacobs et al. | |
| 2010/0070678 A1 | 3/2010 | Zhang | |
| 2012/0239850 A1* | 9/2012 | Qiu | G06F 12/10 711/6 |
| 2013/0339568 A1* | 12/2013 | Corrie | G06F 12/023 711/6 |
| 2015/0039838 A1* | 2/2015 | Tarasuk-Levin | G06F 12/0862 711/137 |
| 2015/0301946 A1* | 10/2015 | Guo | G06F 9/45558 711/6 |
| 2016/0077965 A1* | 3/2016 | Gaonkar | G06F 9/45529 711/153 |
| 2016/0078585 A1* | 3/2016 | Sheldon | G06F 9/45558 345/520 |
| 2016/0350236 A1* | 12/2016 | Tsirkin | G06F 12/1081 |
| 2016/0350244 A1* | 12/2016 | Tsirkin | G06F 13/28 |

OTHER PUBLICATIONS

Corbet. "Guest page hinting". Posted Sep. 6, 2006. <http://lwn.net/Articles/198380/>. Comment posted by rvdheij on Sep. 14, 2006.

Waldspurger, C.A., "Memory Resource Management in VMware ESX Server," Proceedings of the 5th Symposium on Operating Systems Design and Implementation, Boston, Massachusetts, Dec. 9-11, 2002, 15 pages.

Scwidefsky, M. et al., "Collaborative Memory Management in Hosted Linux Environments," (IBM), Linux Symposium, Ottawa, Canada, Jul. 19-22, 2006, 16 pages.

Van Riel, R., "KVM Performance Optimizations Internals," The Red Hat Summit, Boston, Massachusetts, May 5, 2011, 25 pages.

Corbet, J., "Linux Filesystem, Storage, and Memory Management Summit, Day 2," 2011 Linux Filesystem, Storage and Memory Management Summit, San Francisco, California, Apr. 5, 2011, 9 pages.

"The Role of Memory in VMware ESX Server 3—Information Guide," VMware, Inc. Sep. 26, 2006, 11 pages.

Schwidefsky, M., "Linux Kernel Archive: [patch 0/6] [rfc] guest page hinting version 5" (May 11, 2007), downloaded on Jul. 28, 2011 from http://llkml.indiana.edu/hypermail/linux/kernel/0705.1/21 01 html, 2 pages.

Schwidefsky, M., "Linux Kernel Archive: [patch 1/6] Guest page hinting: core+ volatile page cache," (Jun. 28, 2007), downloaded on Jul. 28, 2011 from http://comments.gmane.org/gmane.comp.emulators.kvm .devel/4314, 1 page.

Schwidefsky, M., "Linux Kernel Archive: [patch 2/6] Guest page hinting," (May 11, 2007), downloaded on Jul. 28, 2011 from http://llkml.indiana.edu/hypermail/linux/kernel/0705.1/2100html, 8 pages.

Schwidefsky, M., "Linux Kernel Archive: [patch 3/6] Guest page hinting: mlocked pages," (May 11, 2007), downloaded on Jul. 28, 2011 from http://llkml.indiana.edu/hypermail/linux/kernel/0705.1/21 02html, 3 pages.

Schwidefsky, M., "Linux Kernel Archive: [patch 4/6] Guest page hinting: writable page table entries," (May 11, 2007), downloaded on Jul. 28, 2011 from http://llkml.indiana.edu/hypermail/linux/kernel/0705.1/21 04html, 7 pages.

Schwidefsky, M., "Linux Kernel Archive: [patch 5/6] Guest page hinting: minor fault optimization," (May 11, 2007), downloaded on Jul. 28, 2011 from http://llkml.indiana.edu/hypermail/linux/kernel/0705.1/21 03html, 5 pages.

Schwidefsky, M., "Linux Kernel Archive: [patch 6/6] Guest page hinting: s390 support," (May 11, 2007), downloaded on Jul. 28, 2011 from http://lkml.indiana.edu/hypermail/linux/kernel/0705.1/21 05html, 14 pages.

Schwidefsky, M., "Guest page hinting: cover page" Published Sep. 6, 2006. <http://lwn.net/Articles/198384/>.

* cited by examiner

BATCHED MEMORY PAGE HINTING

TECHNICAL FIELD

The present disclosure is generally related to virtualized computer systems, and more particularly, to memory allocation in virtualized computer systems.

BACKGROUND

Virtualization allows multiplexing of an underlying host machine between different virtual machines. The host machine allocates a certain amount of its resources to each of the virtual machines. Each virtual machine is then able to use the allocated resources to execute applications, including operating systems (referred to as guest operating systems). A software layer that provides the virtualization is commonly referred to as a hypervisor (also known as a virtual machine monitor (VMM)). The hypervisor emulates the underlying hardware of the host computer, making the use of the virtual machine transparent to the guest operating system and the user of the computer.

A host machine can accommodate more virtual machines than the size of its physical memory allows. Using virtual memory techniques, the host machine can give each virtual machine the impression that it has a contiguous address space, while in fact the memory used by the virtual machine may be physically fragmented and even overflow to disk storage. When the host machine needs to free up memory, it selects memory pages that have been assigned to virtual machines, and pages out the contents of those memory pages to secondary storage. When the virtual machines attempt to access those memory pages, the host machine then pages in the contents of the memory page by reading the contents that have been stored in the secondary storage and writing those contents back to memory. Paging out and paging in memory pages requires input/output (I/O) operations, which can cause significant delay for the virtual machine.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
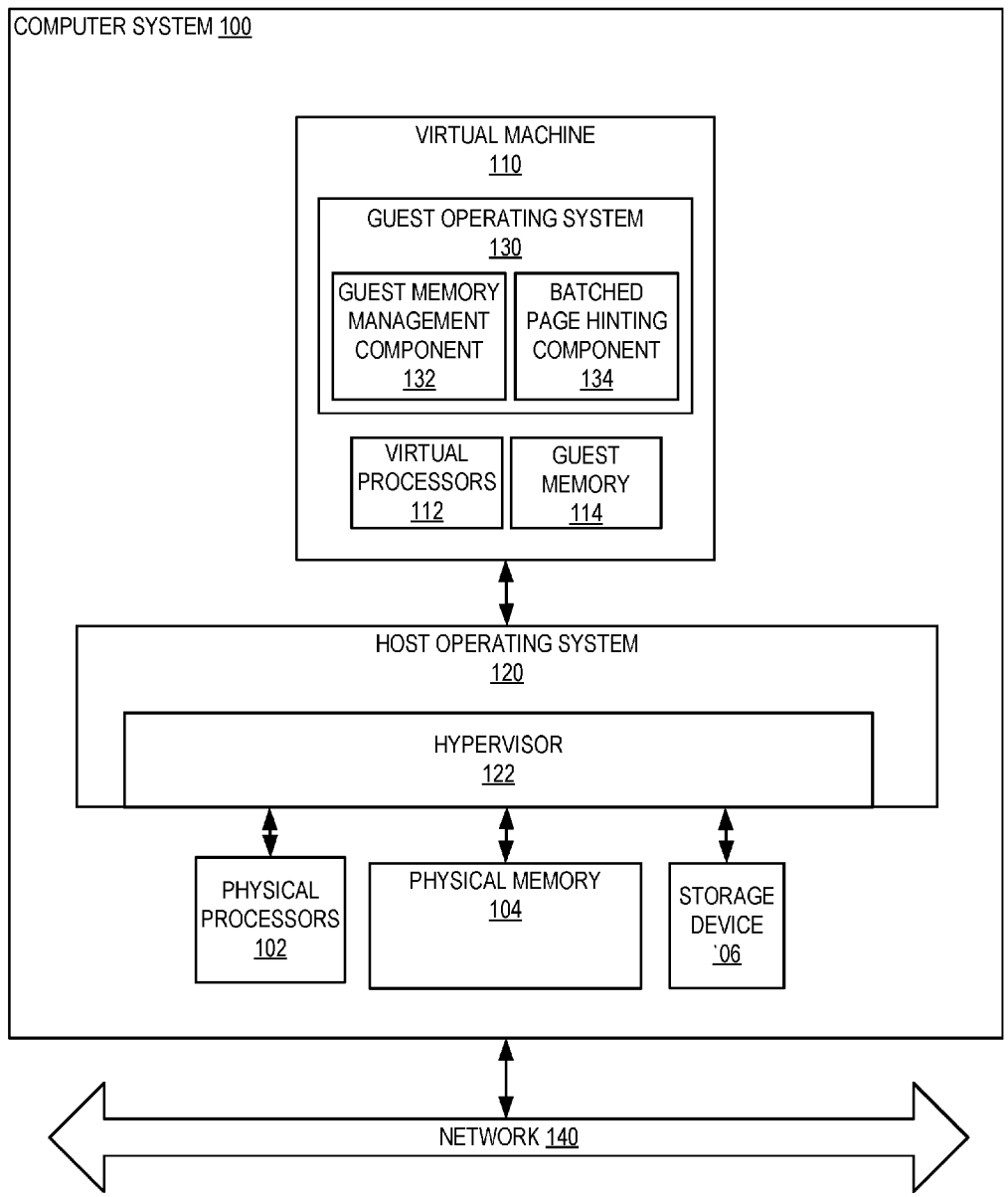
FIG. 1 depicts a high-level block diagram of an example computer system architecture, in accordance with one or more aspects of the present disclosure.

Many modern virtualized computer systems include overlapping memory management features that manage the same underlying physical memory resources. For example, a hypervisor and a guest operating system may both include memory management modules that handle the caching and paging of memory to or from persistent storage depending on whether the memory is in use. The hypervisor may designate memory to a guest operating system but may not be aware of which portions of memory are in use by the guest operating system. Knowledge of the guest OS's use of memory (e.g., memory status information) may be useful when a hypervisor is managing memory because memory that has been released by the guest operating system includes data that can be discarded without preserving (e.g., page swapping) the data to and from persistent storage (e.g., hard disk, solid state storage).

Virtualized computer systems have evolved to share memory status information between the guest operating system and the hypervisor. In one example, the virtualized computer system may include shared memory that stores memory status information. A guest operating system may access the shared memory to store memory status information and the hypervisor may subsequently access the stored memory when determining which memory pages to evict. Use of shared memory may introduce security vulnerabilities and may include additional overhead for restricting or enforcing appropriate access. In another example, the virtualized computer system may include specialized microprocessors with hardware support for identifying memory pages whose contents do not need to be preserved by the hypervisor. The hardware support may be included within specialized microprocessors used for mainframes but may not be included in other microprocessor architectures, such as personal computer processor architectures.

Aspects of the present disclosure address the above and other deficiencies by providing technology for notifying a hypervisor of a set of memory pages that have been released (e.g., freed, deallocated) by a guest operating system. In one example, a guest operating system may release memory pages that were previously in use by the guest operating system. The guest operating system may add an identifier for the memory page to a set of memory pages as the memory pages are released. The guest operating system may also monitor the set of memory pages and when the set satisfies a predetermined threshold quantity the guest operating system may batch the multiple released memory pages together into a hypervisor notification (e.g., hypercall with memory page identifiers). The predetermined threshold quantity may be based on the size of the set and may be a particular quantity of pages (e.g., page count) or may be based on the quantity of space occupied by the pages (e.g., buffer space limit). In response to satisfying the predetermined threshold, the guest operating system may lock the page allocator to prohibit additional changes by the guest operating system while the set of memory pages are being processed and transmitted to the hypervisor. During the processing, the guest operating system may verify that the memory pages of the set have remained unused and may combine them into a message (e.g., hypercall) to the hypervisor to indicate the memory pages have been released. The hypervisor may then use this information to determine whether memory pages designated for the guest operating system can be discarded without persevering the data within the memory pages.

The systems and methods described herein include technology that enhances the memory management of virtualized computer systems. In particular, aspects of the present disclosure provide technology for batching released memory pages into a hypervisor notification, which may avoid the overhead of sending individual notifications for each released memory page. Aspects of the present disclosure may also enable providing memory status information without relying on shared memory that is directly accessible to guest operating systems and the hypervisor. Removing the reliance on shared memory may reduce security vulnerabilities that are inherent with sharing memory external to a guest operating system. Aspects of the present disclose may also enable virtualized computer systems to provide memory status information to hypervisors on computing platforms that do not have embedded hardware support (e.g., mainframes).

Various aspects of the above referenced methods and systems are described in details herein below by way of examples, rather than by way of limitation. The examples provided below discuss a virtualized computer system with a hypervisor and host operating system, but other examples may include a hypervisor without an underlying host operating system (e.g., bare metal hypervisor).

FIG. 1 depicts an illustrative architecture of elements of a computer system 100, in accordance with an embodiment of the present disclosure. It should be noted that other architectures for computer system 100 are possible, and that the implementation of a computer system utilizing embodiments of the disclosure are not necessarily limited to the specific architecture depicted. In the example shown in FIG. 1, computer system 100 may include one or more virtual machines 110 and a host operating system 120.

Computer system 100 may be a single host machine or multiple host machines arranged in a cluster and may include a rackmount server, a workstation, a desktop computer, a notebook computer, a tablet computer, a mobile phone, a palm-sized computing device, a personal digital assistant (PDA), etc. In one example, computer system 100 may be a computing device implemented with x86 hardware. Computer system 100 may include host hardware, which may include one or more physical processors 102, physical memory 104, storage device 106, and hardware components (e.g., I/O devices), or a combination thereof.

Physical processors 102 herein refer to devices capable of executing instructions encoding arithmetic, logical, or I/O operations. In one example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU). It should be noted that although, for simplicity, multiple physical processors 102 are depicted in FIG. 1, in some other embodiments computer system 100 may comprise a single central processing unit.

Physical memory 104 and storage device 106 may include any data storage that is capable of storing digital data. Physical memory 104 may include volatile memory devices (e.g., random access memory (RAM)), non-volatile memory devices (e.g., flash memory, NVRAM), and/or other types of memory devices. Storage device 106 may include mass storage devices, such as magnetic or optical storage based disks, tapes, or hard drives. Storage device 106 may be internal to computer system 100 (as shown) or may be external to computer system 100, such as data storage that is accessed by computer system 100 via a direct connection or a network connection.

Computer system 100 may include a hypervisor 122, which may also be known as a virtual machine monitor (VMM). In the example shown, hypervisor 122 may be a component of a host operating system 120. In another example, hypervisor 122 may run on top of a host operating system 120, or may run directly on host hardware without the use of a host operating system 120. Hypervisor 122 may manage system resources, including access to physical processors 102, physical memory 104, storage device 106, and 110 devices. The hypervisor 122, though typically implemented in software, may emulate and export a bare machine interface to higher level software in the form of virtual processors 112 and guest memory 114. Higher level software may comprise a standard or real-time operating system (OS), may be a highly stripped down operating environment with limited operating system functionality, may not include traditional OS facilities, etc. Hypervisor 122 may present other software (i.e., "guest" software) the abstraction of one or more virtual machines (VMs) 110 that provide the same or different abstractions to various guest software (e.g., guest operating system, guest applications).

Computer system 100 may host any number of virtual machines 110 (e.g., a single VM, one hundred VMs, etc.). Virtual machine 110 may execute guest software that uses an underlying emulation of the physical resources (e.g., virtual processors 112 and guest memory 114). The guest software may include a guest operating system 130, guest applications, guest device drivers, etc. Virtual machine 110 can be, for example, hardware emulation, full virtualization, paravirtualization, and operating system-level virtualization virtual machines. The virtual machine 110 may have the same or different types of guest operating systems 130, such as Microsoft®, Windows®, Linux®, Solaris®, etc.

Guest operating system 130 may include a guest memory management component 132 and a batched page hinting component 134. Components 132 and 134 may be separate components as shown or may be included into the same component. For example, the features provided by batched page hinting component 134 may be integrated into the operations performed by guest memory management component 132 of guest operating system 130. Guest memory management component 132 may manage aspects of guest memory caching, such as the allocation and the release of portions of guest memory 114. Batched page hinting component 134 may notify hypervisor 122 with the memory pages that are released, allocated, or a combination thereof. In one example, batched page hinting component 134 may determine the status of memory pages by analyzing a set of memory pages that have been released. Batched page hinting component 134 may notify the hypervisor when the set of memory pages reaches a threshold (e.g., buffer limit). The features of guest memory management component 132 and batched page hinting component 134 are discussed in more detail below in regards to FIG. 2.

Network 140 may be a public network (e.g., the internet), a private network (e.g., a local area network (LAN) or wide area network (WAN)), or a combination thereof. In one example, network 140 may include a wired or a wireless infrastructure, which may be provided by one or more wireless communications systems, such as a wireless fidelity (WiFi) hotspot connected with the network 140 and/or a wireless carrier system that can be implemented using various data processing equipment, communication towers, etc.

Figure 2:
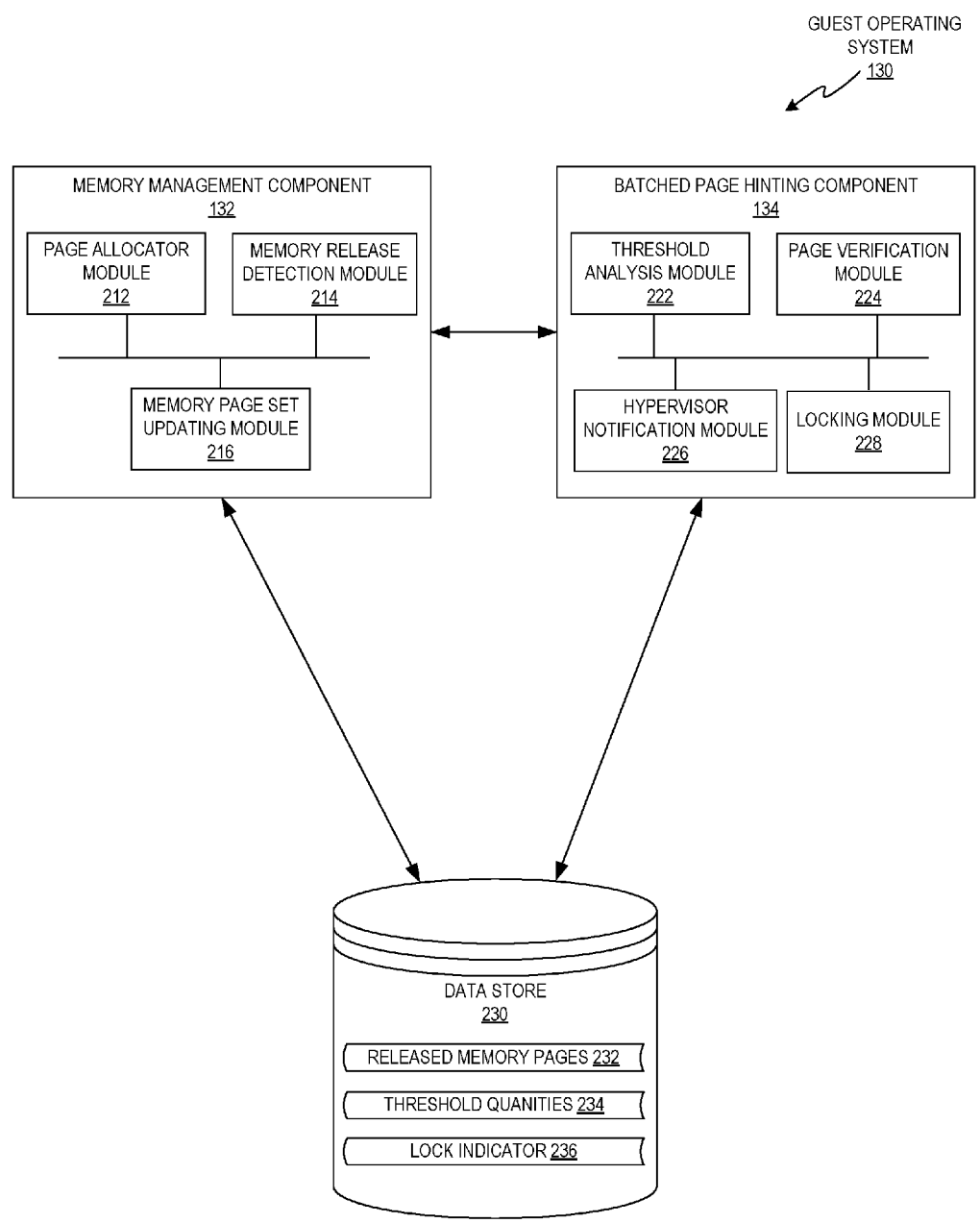
FIG. 2 depicts a block diagram of an example guest operating system that implements batched memory page hinting in accordance with one or more aspects of the present disclosure.

FIG. 2 is a block diagram illustrating example components and modules of guest operating system 130, in accordance with one or more aspects of the present disclosure. Guest operating system 130 may be the same or similar to guest operating system 130 of FIG. 1 and may include a guest memory management component 132, a batched page hinting component 134, and a data store 230. Guest memory management component 132 may include a page allocator module 212, a memory release detection module 214, and a memory page set updating module 216. Batched page hinting component 134 may include a threshold analysis module 222, a page verification module 224, a hypervisor notification module 226, and a locking module 228. More or less components may be included without loss of generality. For example, two or more of the modules may be combined into a single module, or one of the modules may be divided into two or more modules. In one implementation, one or more of the modules may reside on different computing devices (e.g., different server computers, on a single client device, distributed among multiple client devices, etc.).

Page allocator module 212 dynamically allocates portions of memory for use by the guest operating system 130 and releases portions of the memory for reuse when the memory is no longer needed by the guest operating system 130. Page allocator module 212 may allocate memory using memory pages, which may be contiguous or non-contiguous blocks of virtual memory (e.g., a 4K-byte block of memory). The memory pages allocated by page allocator module 212 may have been derived from portions of memory designated for use by the guest operating system 130 by the underlying hypervisor. Releasing memory pages may be the same or similar to freeing memory pages or deallocating memory pages, which may dereference the memory page and enable the memory page to be subsequently reused. In one example, the data within released memory pages 232 may remain within the memory page and may be accessed by another program that is allocated the memory page. In another example, the data within released memory pages 232 may be wiped or cleaned prior to being allocated to another program.

Memory release detection module 214 may be integrated with page allocator module 212 and may detect memory pages that have been released by guest memory management component 132. In one example, detecting released memory pages 232 may involve receiving or listening for a particular event or signal associated with the release of a memory page. In another example, detecting released memory pages 232 may involve accessing or monitoring a data structure that includes memory status information. When memory release detection module 214 detects a released memory page, the memory release detection module 214 may indicate the change to memory page set updating module 216.

Memory page set updating module 216 may generate and update a set of memory pages that indicates which memory pages have been released. The set of memory pages may be stored in any data structure that is capable of identifying a plurality of memory pages. In one example, the set of memory pages may include multiple identifiers for the memory pages that have been released. An identifier of a memory page may include any data for identifying a memory page and may include information about the memory page such as a pointer, location, size, offset, or other information for identifying logical or physical locations of a portion of memory.

Batched page hinting component 134 may access information generated or detected by guest memory management component 132 and propagate some or all of the information to the hypervisor. Batched page hinting component 134 may analyze the set of released memory pages 232 and determine when and how to notify the hypervisor of released memory pages 232. In one example, batched page hinting component 134 may avoid notifying the hypervisor each time a memory page is released and may instead batch multiple released memory pages 232 together into a single notification to enhance the efficiency of the guest operating system and hypervisor. This may be advantageous because it may reduce the communications overhead (e.g., I/O) that occurs between the guest operating system and hypervisor. In the example, shown in FIG. 2, batched page hinting component 134 may include a threshold analysis module 222, a page verification module 224, a hypervisor notification module 226, and a locking module 228.

Threshold analysis module 222 may analyze the set of memory pages to determine whether the set of memory pages satisfies one or more threshold quantities 234. One or more of the threshold quantities 234 may be analyzed in view of the size of the set and may be a particular quantity of pages (e.g., page count) or a quantity of space occupied by the pages (e.g., buffer space limit). Threshold quantities 234 may be any values such as integers, percentages, ratios, other values, or a combination thereof. The values may be relative to the size or limit of the memory, heap, page, set, buffer, other structure, or a combination thereof. Threshold quantities 234 may include a first predetermined threshold quantity and a second predetermined threshold quantity. The first predetermined threshold quantity of threshold quantities 234 may indicate a minimum size that the set may reach before batching the set of memory pages into a notification for the hypervisor. The second predetermined threshold quantity will be discussed in more detail below and may relate to an updated set of memory pages (e.g., set of verified pages) and may indicate when a notification should be delayed. Once the set of memory pages satisfies the first predetermined threshold quantity the guest operating system 130 may verify the set using page verification module 224.

Page verification module 224 may analyze the set of memory pages to verify that the memory pages remain unused. As discussed above, the memory pages may be added to the set when they are released by the guest operating system but one or more of the memory pages within the set may be subsequently reused without being removed from the set. In one example, page verification module 224 may analyze the memory pages to ensure that they are not in use by checking a flag associated with the memory page. In another example, page verification module 224 may query functions of the guest operating system 130, hypervisor, host operating system, other software module, or a combination thereof to determine whether the memory page is in use. When page verification module 224 determines a memory page of the set of memory pages is in use it may signal memory page set updating module 216 to remove the memory page from the set. The memory pages that remain in the set may then be analyzed and processed by hypervisor notification module 226.

Hypervisor notification module 226 may notify the hypervisor of the memory pages that have been released by guest operating system 130. Hypervisor notification module 226 may combine (e.g., batch) the identifiers for each of the released memory page in a message and may transmit the message to the hypervisor. In one example, transmitting the message to the hypervisor may involve making a call to a programming interface of the hypervisor. The call may be a hypercall, a system call, other type of call, or a combination thereof.

Locking module 228 may provide a locking mechanism to lock the page allocator module 212 from allocating memory pages while batched page hinting component 134 is preparing a notification for the hypervisor. The ability to lock (e.g., stop, pause, restrict, prohibit) the page allocator module 212 may be useful because it may reduce the possibility that a hypervisor notification can be undermined during the processing phase and indicate that a memory page is released when the memory page is actually in use. In one example, locking module 228 may acquire a lock on the page allocator in response to threshold analysis module 222 determining the set of memory pages has satisfied the threshold quantity. The lock may be held while page verification module 224 and hypervisor notification module 226 process the set of memory pages. The lock may be released or withdrawn after the hypervisor notification module has transmitted the message or in response to receiving a response from the hypervisor indicating the message was received and/or processed by the hypervisor. Acquiring the lock and releasing the lock may involve updating a lock indicator 236.

Lock indicator 236 may be any locking data structure that is accessible to guest operating system 130 and is capable of indicating a lock has been acquired. The locking data structure may include a bit or sequence of bits and may represent two or more states. Lock indicator 236 may include numeric or non-numeric values for indicting or representing the two states. In one example, lock indicator 236 may be a bit sequence that includes a counter (e.g., integer counter) that can be accessed by one or more virtual processors managed by guest operating system 130. The counter may be a processor counter (e.g., virtual CPU counter), a global counter (e.g., guest OS counter), other counter, or a combination thereof. The processor counter may correspond to a particular virtual processor managed by the guest operating system whereas the global counter may correspond to some or all of the virtual processors managed by the guest operating system.

Lock indicator 236 may represent multiple different states that may correspond to the current state of the lock and may also indicate one or more state transitions that may have occurred since the lock was acquired. As discussed above, lock indicator 236 may include a counter and the counter may be updated (e.g., incremented or decremented) by one or more virtual processors to acquire or release a lock on the page allocator module 212. In one example, the counter may be continuously updated (e.g., incremented) to different values and a category of the value, as opposed to the specific value, may determine the state. The category of values may be based on whether the value evaluates to an even number, odd number, prime number, or whether it is or is not divisible my a particular number N, wherein N is any real number (e.g., 3, 4, 5, 6, . . . N). In one example, locking module 228 may increment lock indicator 236 to an even number to indicate a lock has been acquired and subsequently increment the lock indicator again to an odd number to indicate the lock has been released (e.g., unlocked). In another example, locking module 228 may increment lock indicator 236 to an even number to indicate a lock has been acquired and subsequently decrement the lock indicator to an odd number to indicate the lock has been released (e.g., unlocked). The former example, which involves continually updating the lock indicator 236 in the same direction (e.g., incrementing), may be advantageous because it may enable the locking module to detect state transitions and therefore a third state. The third state may indicate that the lock indicator has changed since it was last updated, which may indicate another virtual processor has locked the page allocator and may indicate a race condition has occurred or may be occurring.

Figure 3:
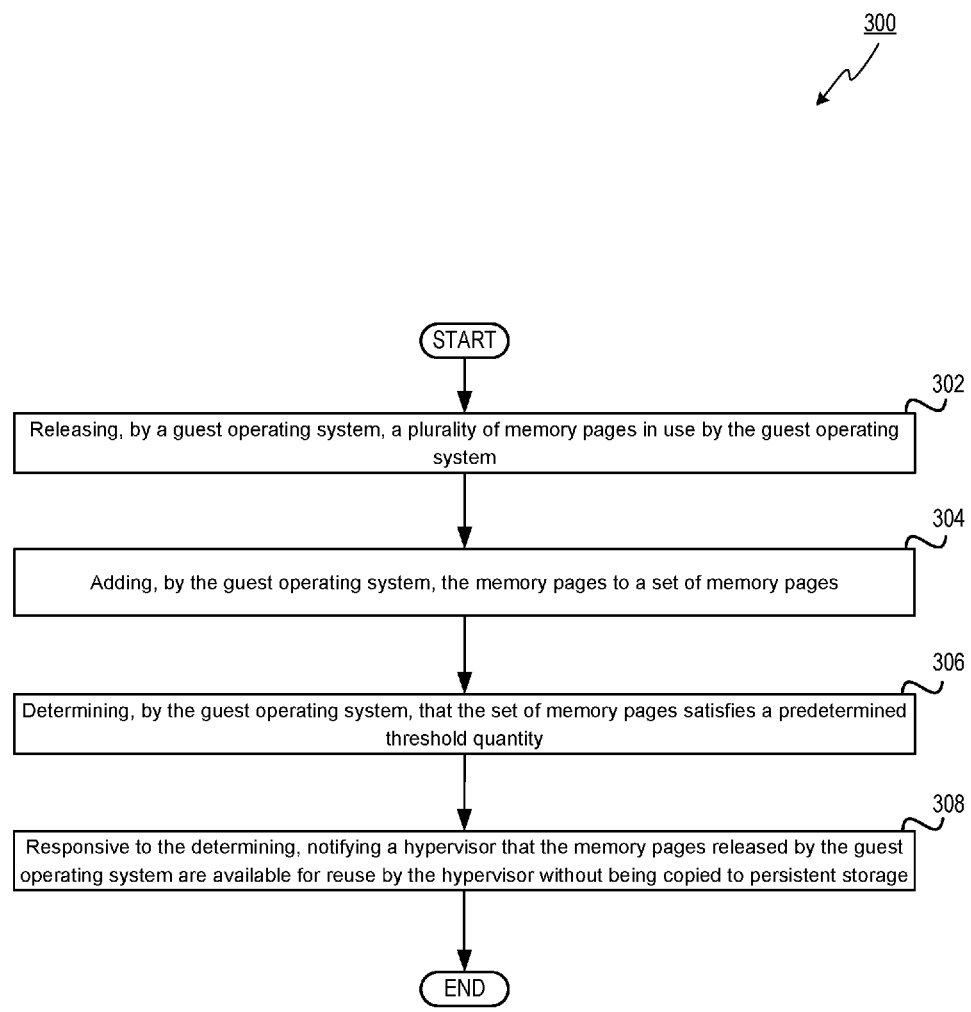
FIG. 3 depicts a flow diagram of an example method for batched memory page hinting, in accordance with one or more aspects of the present disclosure.

FIG. 3 depicts a flow diagram of one illustrative example of a method 300 for batching free memory page hints, in accordance with one or more aspects of the present disclosure. Method 300 and each of its individual functions, routines, subroutines, or operations may be performed by one or more processors of the computer device executing the method. In certain implementations, method 300 may be performed by a single processing thread. Alternatively, methods 300 may be performed by two or more processing threads, each thread executing one or more individual functions, routines, subroutines, or operations of the method. In an illustrative example, the processing threads implementing methods 300 may be synchronized (e.g., using semaphores, critical sections, and/or other thread synchronization mechanisms). Alternatively, the processes implementing method 300 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 300 may be performed by memory management component 132 and/or batched page hinting component 134 as shown in FIGS. 1 and 2.

Method 300 may be performed by processing devices of a server device or a client device and may begin at block 302. At block 302, a processing device executing a guest operating system may release a plurality of memory pages in use by the guest operating system. The guest operating system may be executing on a virtual machine comprising a plurality of virtual processors that are provided (e.g., emulated) by the hypervisor. The plurality of memory pages may be contiguous or non-contiguous blocks of virtual memory (e.g., a 4K-byte block of memory). The memory pages may be designated by a hypervisor for use for a particular guest operating system or for a particular virtual processor of the guest operating system. In one example, the set of memory pages may include a plurality of non-contiguous memory pages of only one of the plurality of virtual processors.

At block 304, the processing device executing the guest operating system may add the released memory pages to a set of memory pages. The set of memory pages may be stored in a data structure that is accessible to the guest operating system without being accessible to the hypervisor. The set of memory pages may be updated each time a memory page is released to add an identifier corresponding to the released memory page. An identifier of a memory page may include any data for identifying the memory page and may include information about the memory page such as a pointer, location, size, offset, or other information for identifying logical or physical locations of a portion of memory. After a memory page is released and added to the set of memory pages, it may be reused by the guest operating system without being removed from the set of memory page. This may occur because the page allocator of the guest operating system may continue to function after a particular memory page is added to the set. As a result, the page allocator may provide (e.g., allocate) the particular memory page for reuse without the memory page being removed from the set. The existence of memory pages that are in use (e.g., no longer released) may be addressed during a memory verification process discussed below.

At block 306, the processing device executing the guest operating system may determine that the set of memory pages satisfies a predetermined threshold quantity. In one example, the determination of whether the threshold has been satisfied may involve analyzing the set of memory pages in view of one or more predetermined threshold quantities. One or more of the threshold quantities may be based on the size of the set and may be a particular quantity of pages (e.g., page count) or may be based on the quantity of space occupied by the pages (e.g., buffer space limit). In one example, the threshold quantity may indicate a minimum size that the set may reach before being batched together into a notification destined for the hypervisor.

Responsive to determining the threshold has been satisfied, the processing device may acquire a lock that prevents a page allocator of the guest operating system from allocating memory pages before notifying the hypervisor. The page allocator may be for a particular virtual processor or portion of guest memory or may be for all virtual processors and guest memory associated with the guest operating system. Acquiring the lock may involve updating a lock indicator that includes a counter. The counter may correspond to a processor counter or a global counter, wherein the process counter corresponds to a particular virtual processor of the virtual machine and the global counter corresponds to multiple virtual processors of the virtual machine. In one example, acquiring the lock may involve incrementing the counter a first time to an even number and releasing the lock may involve incrementing the counter a second time to an odd number. After acquiring the lock, the processing device may verify that the set of the memory pages remain unused after being released. During the verification of the set of memory pages, the processing device may remove any memory pages that are now in use.

At block 308, the processing device executing the guest operating system may notify a hypervisor that the memory pages released by the guest operating system are available for reuse by the hypervisor without being copied to persistent storage. Notifying the hypervisor of the release memory pages may involve forming a message comprising memory page identifiers corresponding to the set of memory pages and transmitting the message to the hypervisor using a hypercall. The persistent storage may include a swap space and the particular memory pages released by the guest operating system may be reused by the hypervisor without copying the particular memory page to the swap space. In one example, the processing device may access the particular memory pages after being reused by the hypervisor without the hypervisor copying the memory page from the swap space. Responsive to completing the operations described herein above with references to block 308, the method may terminate.

Figure 4:
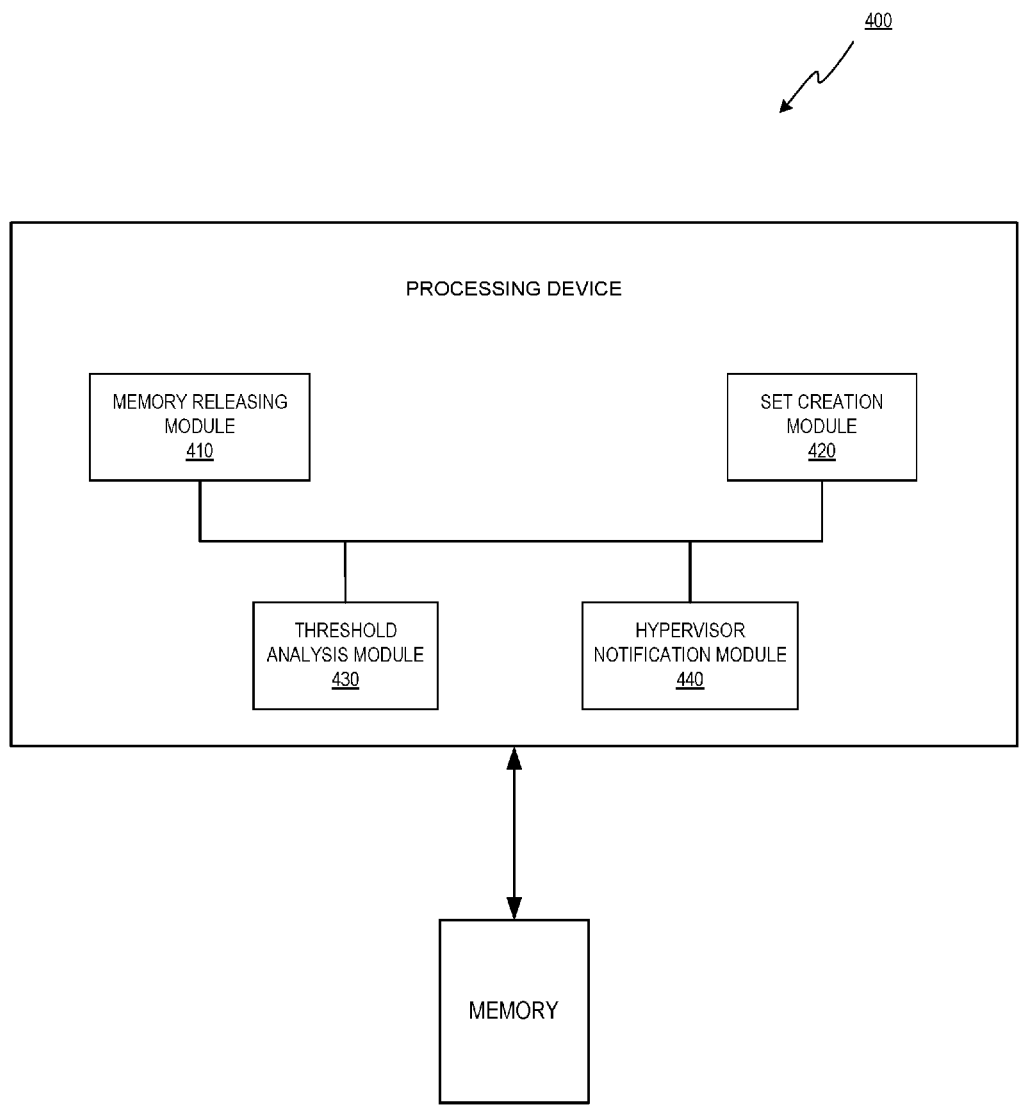
FIG. 4 depicts a block diagram of an example computer system in accordance with one or more aspects of the present disclosure.

FIG. 4 depicts a block diagram of a computer system 400 operating in accordance with one or more aspects of the present disclosure. Computer system 400 may be the same or similar to computer system 100 and may include one or more processing devices and one or more memory devices. In the example shown, computer system 400 may include memory releasing module 410, set creation module 420, threshold analysis module 430, and hypervisor notification module 440.

Memory releasing module 410 may instruct the processing device to release a plurality of memory pages in use by a guest operating system. The guest operating system may be executing on a virtual machine comprising a plurality of virtual processors that are provided by the hypervisor. The plurality of memory pages may be contiguous or non-contiguous blocks of virtual memory (e.g., a 4K-byte block of memory). The memory pages may be designated by a hypervisor for use for a particular guest operating system or for a particular virtual processor of the guest operating system.

Set creation module 420 may instruct the processing device to add the released memory pages to a set of memory pages. The set of memory pages may be stored in a data structure that is accessible to the guest operating system without being accessible to the hypervisor. The set of memory pages may be updated each time a memory page is released to add an identifier corresponding to the released memory page. An identifier of a memory page may include any data for identifying the memory page and may include information about the memory page such as a pointer, location, size, offset, or other information for identifying logical or physical locations of a portion of memory. After a memory page is released and added to the set of memory pages it may be reused by the guest operating system without being removed from the set of memory page. The existence of memory pages that are in use included within the set of released memory pages may be subsequently addressed during a memory verification process as discussed above.

Threshold analysis module 430 may instruct the processing device to determine whether the set of memory pages satisfies a predetermined threshold quantity. Determining whether the threshold has been satisfied may involve analysis of the set of memory pages in view of one or more predetermined threshold quantities. One or more of the threshold quantities may be based on the size of the set and may be a particular quantity of pages (e.g., page count) or may be based on the quantity of space occupied by the pages (e.g., buffer space limit). The threshold quantity may indicate a minimum size that the set may reach before being batched together into a hypervisor notification.

Hypervisor notification module 440 may instruct the processing device to notify a hypervisor that the memory pages released by the guest operating system are available for reuse by the hypervisor without being copied to persistent storage. Notifying the hypervisor of the released memory pages may involve forming a message comprising memory page identifiers corresponding to the set of memory pages and transmitting the message to the hypervisor using a hypercall. The persistent storage may include a swap space and the particular memory pages released by the guest operating system may be reused by the hypervisor without copying the particular memory page to the swap space. In one example, the processing device may access the particular memory pages after being reused by the hypervisor without the hypervisor copying the memory page from the swap space.

Figure 5:
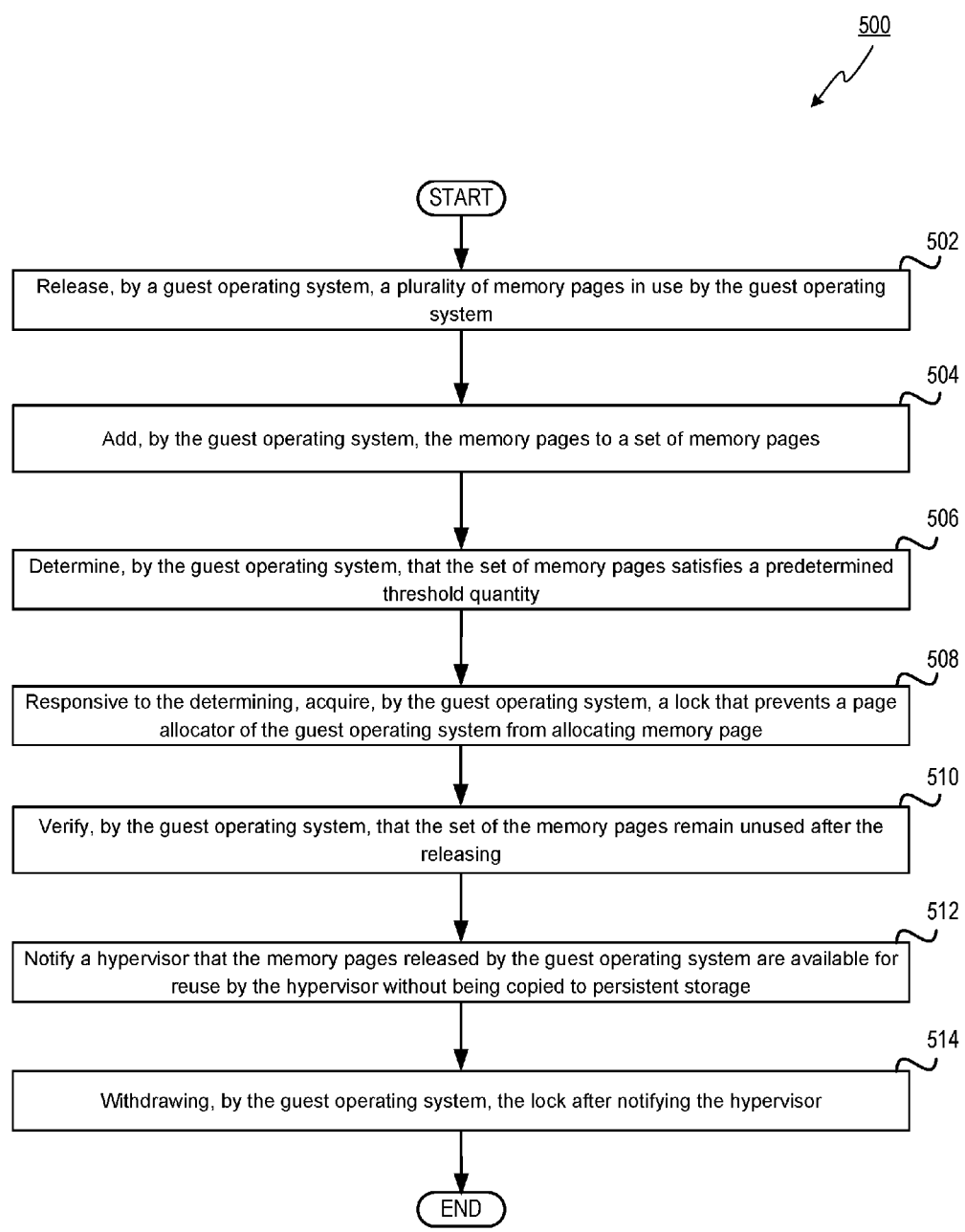
FIG. 5 depicts a flow diagram of another example method for batched memory page hinting, in accordance with one or more aspects of the present disclosure.

FIG. 5 depicts a flow diagram of one illustrative example of a method 500 for batched free memory page hinting, in accordance with one or more aspects of the present disclosure. Method 500 may be similar to method 300 and may be performed in the same or a similar manner as described above in regards to method 300. Method 500 may be performed by processing devices of a server device or a client device and may begin at block 502. At block 502, a processing device executing a guest operating system may release a plurality of memory pages in use by the guest operating system. The guest operating system may be executing on a virtual machine comprising a plurality of virtual processors that are provided (e.g., emulated) by the hypervisor. The plurality of memory pages may be contiguous or non-contiguous blocks of virtual memory (e.g., a 4K-byte block of memory). The memory pages may be designated by a hypervisor for use for a particular guest operating system or for a particular virtual processor of the guest operating system. In one example, the set of memory pages may include a plurality of non-contiguous memory pages of only one of the plurality of virtual processors.

At block 504, the processing device executing the guest operating system may add the released memory pages to a set of memory pages. The set of memory pages may be stored in a data structure that is accessible to the guest operating system without being accessible to the hypervisor. The set of memory pages may be updated each time a memory page is released to add an identifier corresponding to the released memory page. An identifier of a memory page may include any data for identifying the memory page and may include information about the memory page such as a pointer, location, size, offset, or other information for identifying logical or physical locations of a portion of memory. After a memory page is released and added to the set of memory pages, it may be reused by the guest operating system without being removed from the set of memory page. This may occur because the page allocator of the guest operating system may continue to function after a particular memory page is added to the set. As a result, the page allocator may provide (e.g., allocate) the particular memory page for reuse without the memory page being removed from the set. The existence of memory pages that are in use (e.g., no longer released) may be addressed during a memory verification process discussed below.

At block 506, the processing device executing the guest operating system may determine that the set of memory pages satisfies a predetermined threshold quantity. In one example, the determination of whether the threshold has been satisfied may involve analyzing the set of memory pages in view of one or more predetermined threshold quantities. One or more of the threshold quantities may be based on the size of the set and may be a particular quantity of pages (e.g., page count) or may be based on the quantity of space occupied by the pages (e.g., buffer space limit). In one example, the threshold quantity may indicate a minimum size that the set may reach before being batched together into a notification destined for the hypervisor.

At block 508, the processing device executing the guest operating system, responsive to the determining, may acquire a lock that prevents a page allocator of the guest operating system from allocating memory pages. The page allocator may be for a particular virtual processor or portion of guest memory or may be for all virtual processors and guest memory associated with the guest operating system. Acquiring the lock may involve updating a lock indicator that includes a counter. The counter may correspond to a processor counter or a global counter and the process counter may correspond to a particular virtual processor of the virtual machine and the global counter may correspond to multiple virtual processors of the virtual machine. In one example, acquiring the lock may involve incrementing the counter a first time to an even number and releasing the lock may involve incrementing the counter a second time to an odd number.

At block 510, the processing device executing the guest operating system may verify that the set of the memory pages remain unused after being released. During the verification, the processing device may perform operations discussed above in regards to page verification module 224 of FIG. 2 and may update the set to remove any memory pages that are now in use. In one example, the processing device may analyze the memory pages to verify that they are not in use (e.g., remain unused) by checking a flag associated with the memory page. In another example, the processing device may query functions of the guest operating system, hypervisor, host operating system, other software module, or a combination thereof to verify the memory pages are not in use (e.g., remain unused). When the processing device determines a memory page of the set of memory pages is in use it may update the set to remove the memory page from the set.

In another example, the method 500 may further involve determining whether the updated set of memory pages is below one or more threshold quantities (e.g., a second predetermined threshold quantity). The updated set of memory pages may now include less memory pages then the original set of memory pages and it may not justify the overhead of notifying the hypervisor. For example, if there are no memory pages or only a couple of memory pages in the updated set, it may be worth delaying the notification until more memory pages are in the set to enhance system performance. The processing device may determine whether to delay the notification by comparing the updated set of released memory pages to a second predetermined threshold quantity. The second predetermined threshold quantity may be the same or similar the first predetermined threshold quantity discussed above. In one example, the second predetermined threshold may have a lower value than the first predetermined threshold quantity and may indicate a threshold in which a hypervisor notification should be withdrawn (e.g., canceled, aborted). The second predetermined threshold may be an absolute value, a relative value, percentage value, or other value that relates to the size of the updated set of memory pages or to the first predetermined threshold quantity. For example, the second predetermined threshold value may be approximately 50% (or other numeric value) of the first predetermined threshold quantity, in which case if the verification processes removes more than 50% of the original set of memory pages the processing device may withdraw from notifying the hypervisor and may delay until the number of memory pages within the set increases. In other examples, there may be other thresholds involved in determining whether to notify the hypervisor of memory pages released by the guest operating system. In one example, a threshold time may be used to initiate or delay a notification to the hypervisor. For example, if the duration of time since a prior notification satisfies (e.g., exceeds) a threshold time, the processing device may initiate a notification to the hypervisor. Conversely, if the duration of time since a prior notification does not satisfy (e.g., beneath) the threshold time, the processing device may delay the initiation of the notification or withdraw from a previously initiated notification to the hypervisor.

At block 512, the processing device executing the guest operating system may notify a hypervisor that the memory pages released by the guest operating system are available for reuse by the hypervisor without being copied to persistent storage. Notifying the hypervisor of the release memory pages may involve forming a message comprising memory page identifiers corresponding to the set of memory pages and transmitting the message to the hypervisor using a hypercall. The persistent storage may include a swap space and the particular memory pages released by the guest operating system may be reused by the hypervisor without copying the particular memory page to the swap space. In one example, the processing device may access the particular memory pages after being reused by the hypervisor without the hypervisor copying the memory page from the swap space.

At block 514, the processing device executing the guest operating system may withdraw the lock after notifying the hypervisor. Responsive to completing the operations described herein above with references to block 508, the method may terminate.

Figure 6:
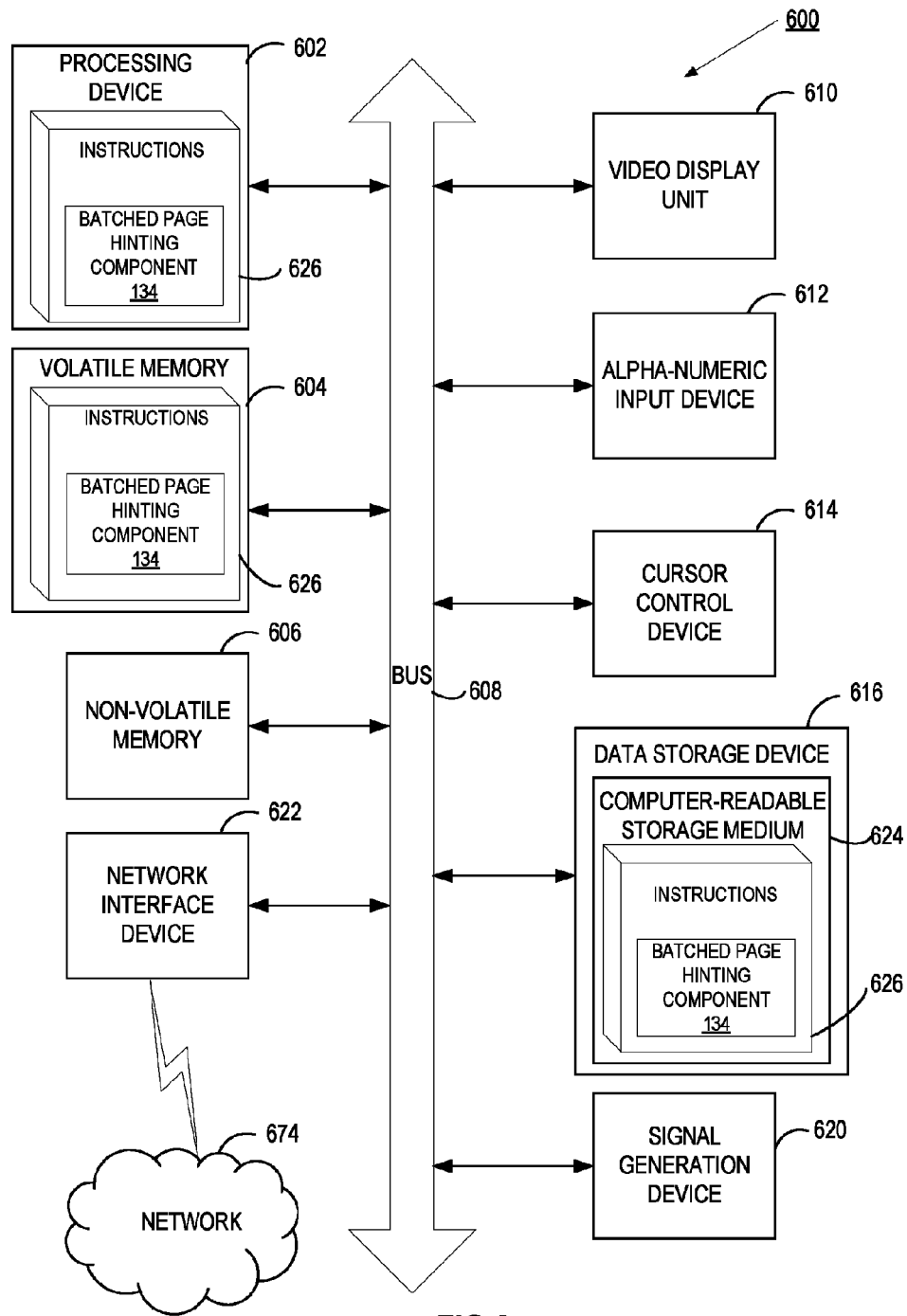
FIG. 6 depicts a block diagram of an illustrative computing device operating in accordance with the examples of the present disclosure.

FIG. 6 depicts a block diagram of a computer system operating in accordance with one or more aspects of the present disclosure. In various illustrative examples, computer system 600 may correspond to computer system 100 of FIG. 1. The computer system may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a computing device to translate these requests to the underlying physical computing hardware resources. This type of virtualization results in multiple VMs sharing physical resources.

In certain implementations, computer system 600 may be connected (e.g., via a network, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 may include a processing device 602, a volatile memory 604 (e.g., random access memory (RAM)), a non-volatile memory 606 (e.g., read-only memory (ROM) or electrically-erasable programmable ROM (EEPROM)), and a data storage device 616, which may communicate with each other via a bus 608.

Processing device 602 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 may further include a network interface device 622. Computer system 600 also may include a video display unit 610 (e.g., an LCD), an alphanumeric input device 612 (e.g., a keyboard), a cursor control device 614 (e.g., a mouse), and a signal generation device 620.

Data storage device 616 may include a non-transitory computer-readable storage medium 624 on which may store instructions 626 encoding any one or more of the methods or functions described herein, including instructions for implementing methods 300 or 500 and for encoding batched page hinting component 134 and modules illustrated in FIGS. 1 and 2.

Instructions 626 may also reside, completely or partially, within volatile memory 604 and/or within processing device 602 during execution thereof by computer system 600, hence, volatile memory 604 and processing device 602 may also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "initiating," "transmitting," "receiving," "analyzing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 300 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
    releasing, by a processing device executing a guest operating system, a plurality of memory pages in use by the guest operating system;
    adding, by the guest operating system, the memory pages to a set of memory pages;
    determining, by the guest operating system, that the set of memory pages satisfies a predetermined threshold quantity; and
    responsive to the determining, notifying a hypervisor that the memory pages released by the guest operating system are available for reuse by the hypervisor without being copied to persistent storage.

2. The method of claim 1, wherein the persistent storage comprises a swap space and the memory pages released by the guest operating system are reused by the hypervisor without the hypervisor copying the memory pages to the swap space.

3. The method of claim 1, further comprising: accessing, by the guest operating system, the memory pages after being reused by the hypervisor without the hypervisor copying the memory pages from the swap space.

4. The method of claim 1, wherein the set of memory pages is stored in a data structure that is accessible to the guest operating system without being accessible to the hypervisor.

5. The method of claim 1, wherein notifying the hypervisor comprises:
    forming, by the guest operating system, a message comprising memory page identifiers corresponding to the memory pages of the set; and
    transmitting, by the guest operating system, the message to the hypervisor using a hypercall.

6. The method of claim 1, further comprising:
    acquiring, by the guest operating system, a lock that prevents a page allocator of the guest operating system from allocating memory pages before notifying the hypervisor;
    verifying, by the guest operating system, that the set of the memory pages remain unused after the releasing; and
    withdrawing, by the guest operating system, the lock after receiving a response to the notifying the hypervisor.

7. The method of claim 6, wherein acquiring the lock comprises updating a lock indicator in response to determining that the set of memory pages exceed the predetermined threshold quantity.

8. The method of claim 7, wherein the lock indicator comprises a counter, and wherein acquiring the lock comprises incrementing the counter a first time to an even number and withdrawing the lock comprises incrementing the counter a second time to an odd number.

9. The method of claim 8, wherein the counter corresponds to one or more of a processor counter or a global counter, wherein the process counter corresponds to a particular virtual processor of the virtual machine and the global counter corresponds to multiple virtual processors of the virtual machine.

10. The method of claim 6, wherein verifying that the set of memory pages remain unused comprises:
    inspecting, by the guest operating system, a flag associated with each memory page of the set of memory pages to determine whether a corresponding memory page is in use; and
    updating the set to remove the memory page in response to determining the corresponding memory page is in use.

11. The method of claim 10, further comprising:
    determining whether the updated set of memory pages satisfies a second predetermined threshold; and
    delaying the notification of the hypervisor in response to the updated set of memory pages not satisfying the second predetermined threshold quantity.

12. The method of claim 1, wherein the guest operating system is executing on a virtual machine comprising a plurality of virtual processors provided by the hypervisor, and wherein the set of memory pages comprise a plurality of non-contiguous memory pages of one of the plurality of virtual processors.

13. A system comprising:
    a memory;
    a processing device operatively coupled to the memory, the processing device to:
        release, by a guest operating system, a plurality of memory pages in use by the guest operating system;
        add, by the guest operating system, the memory pages to a set of memory pages;
        determine, by the guest operating system, that the set of memory pages satisfies a predetermined threshold quantity; and
        responsive to the determining, notify a hypervisor that the memory pages released by the guest operating system are available for reuse by the hypervisor.

14. The system of claim 13, wherein the persistent storage comprises a swap space and the memory pages released by the guest operating system are reused by the hypervisor without the hypervisor copying the memory pages to the swap space.

15. The system of claim 13, wherein the processing device is further to: access the memory pages after being reused by the hypervisor without the hypervisor copying the memory page from the swap space.

16. The system of claim 13, wherein the set of memory pages is stored in a data structure that is accessible to the guest operating system without being accessible to the hypervisor.

17. A non-transitory machine-readable storage medium storing instructions that cause a processing device to:
    release, by a guest operating system, a plurality of memory pages in use by the guest operating system;
    add, by the guest operating system, the memory pages to a set of memory pages;
    determine, by the guest operating system, that the set of memory pages satisfies a predetermined threshold quantity;

responsive to the determining, acquire, by the guest operating system, a lock that prevents a page allocator of the guest operating system from allocating memory pages;

verify, by the guest operating system, that the set of the memory pages remain unused after the releasing;

notify a hypervisor that the memory pages released by the guest operating system are available for reuse by the hypervisor; and withdraw, by the guest operating system, the lock after notifying the hypervisor.

18. The non-transitory machine-readable storage medium of claim 17, wherein the persistent storage comprises a swap space and the memory pages released by the guest operating system are reused by the hypervisor without the hypervisor copying the memory pages to the swap space.

19. The non-transitory machine-readable storage medium of claim 17, wherein the processing device is further to: access the memory pages after being reused by the hypervisor without the hypervisor copying the memory pages from the swap space.

20. The non-transitory machine-readable storage medium of claim 17, wherein the set of memory pages is stored in a data structure that is accessible to the guest operating system without being accessible to the hypervisor.

\* \* \* \* \*